United States Patent Office 3,216,073
Patented Nov. 9, 1965

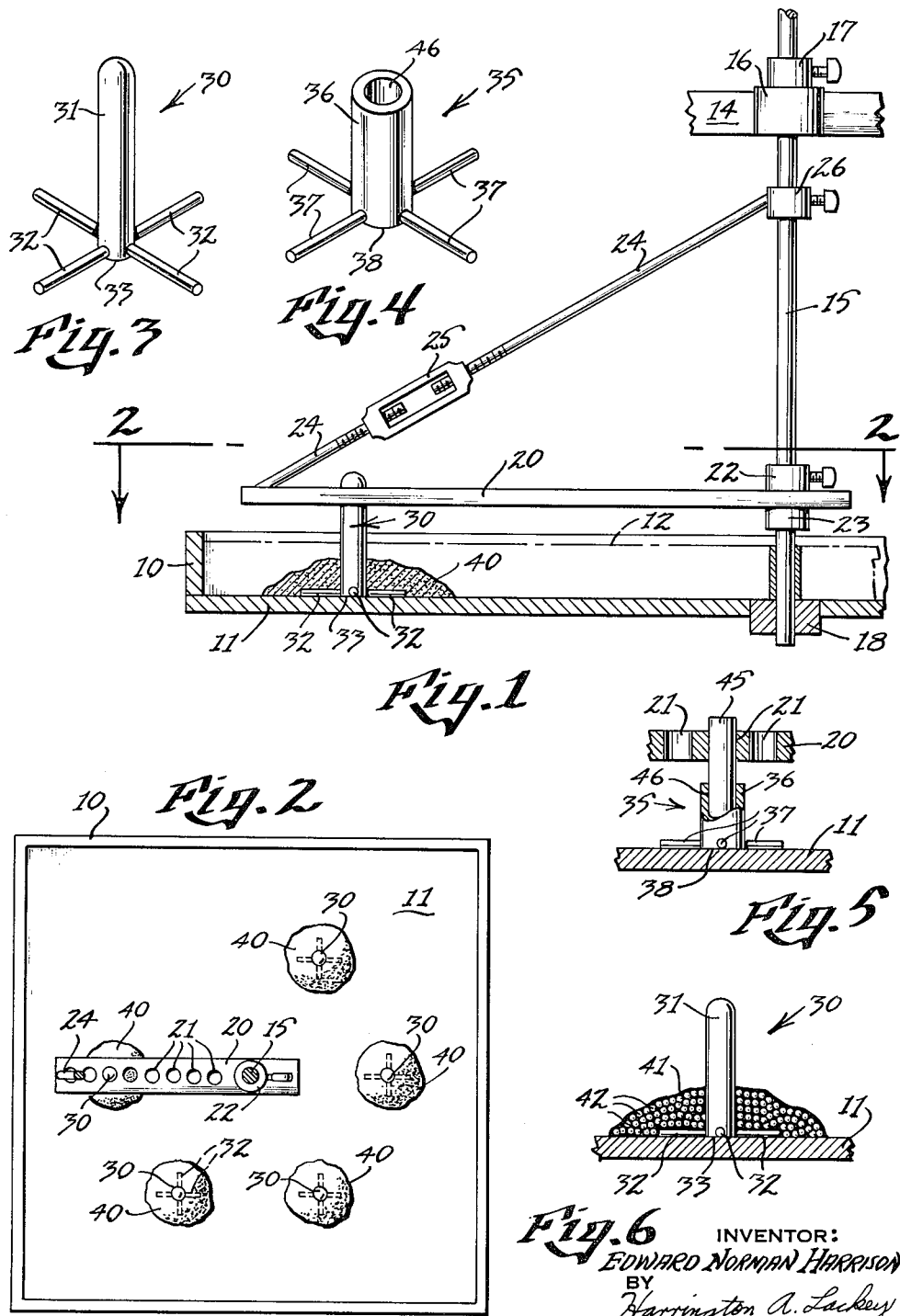
Nov. 9, 1965 E. N. HARRISON 3,216,073
METHOD AND DEVICE FOR ACCURATELY ALIGNING
SHAPED FOUNDRY ARTICLES
Filed Feb. 26, 1964
INVENTOR:
EDWARD NORMAN HARRISON
BY
Harrington A. Lackey
ATTORNEY

3,216,073
METHOD AND DEVICE FOR ACCURATELY
ALIGNING SHAPED FOUNDRY ARTICLES
Edward N. Harrison, P.O. Box 1206, Decatur, Ga.
Filed Feb. 26, 1964, Ser. No. 347,445
5 Claims. (Cl. 22—193)

This is a continuation-in-part of patent application S.N. 51,632, filed August 24, 1960, now abandoned. This invention relates to a method for accurately aligning the mating halves of shaped foundry articles or devices, and more particularly to a method for setting novel alignment pins and bushings in the shaped articles.

In the conventional practice of manufacturing shaped foundry articles, such as patterns and molds, the articles are made first, and then the alignment pins and bushings are located and fixed to the opposing halves so that the corresponding pins and bushings of the opposing halves may accurately register for assembling the article for casting. If these pins and bushings are not aligned to close tolerances, then the casting will be dimensionally inaccurate.

For example, in the setting of pins and bushings on a pair of pattern halves, the pins and bushings can be very accurately located on these halves by conventional machine tools, such as a jig borer. By manipulating the jig borer, the position for a bushing may be located at one end of the cope, or positive half, and the position of an alignment pin may be very accurately located at the opposite end of the cope. Moreover, the positions for the pin and bushing on the drag, or negative half, adapted to register with the corresponding bushing and pin on the cope, may also be very accurately located by the jig borer. Although there is little difficulty in precisely locating the position of these respective pins and bushings, inaccuracy in alignment of the pins and bushings can, and often does, develop when the tool actually bores and cuts into the faces of the pattern halves to form the holes for receiving the pins and bushings. Since the drilling of the tool into the metal of the pattern halves is subjected to wear, drift, friction and other factors which cause even very slight inaccuracies, nevertheless, the corresponding mis-alignment of the pattern halves, produces a dimensionally inaccurate mold and also a finished product. This slight mis-alignment is known as a "shift" in foundry practice and can occur even with the use of the sophisticated machine tools now known, such as jig borers, which operate to ultra-accurate tolerances, and usually in an air conditioned room.

It is therefore an object of this invention to overcome the disadvantages enumerated by providing novel alignment devices and a process for very accurately aligning the mating halves of shaped foundry articles, such as patterns and molds.

Another object of this invention is to provide a method for setting alignment pins and bushings in shaped article halves without drilling or cutting.

Another object of this invention is to provide a method for accurately setting the alignment pins and bushings in shaped foundry articles before the articles are formed.

A further object of this invention is to provide a foundry method for accurately locating and setting the alignment pins and bushings and then molding, casting or otherwise forming the shaped article halves around the pins or bushings to eliminate shifts in the article halves.

Another object of this invention is to provide a method for accurately locating the alignment pins and bushings in shaped articles by forming each article half from fluent solid bodies which may be solidified about the pins and bushings with a minimum of effort and technology.

A further object of this invention is to provide a novel method of setting alignment pins and bushing in shaped foundry article halves in which the halves are made from fluent solid bodies which may be bound into a solidified structure by adhesives or magnetism.

Another object of this invention is to provide novel alignment pins and bushings for use in the alignment of shaped foundry article halves.

Further objects and advantages of the invention will be apparent from the following description taken in conjunction with the drawings, wherein:

FIG. 1 is a fragmentary sectional elevation of an apparatus for locating an alignment pin;

FIG. 2 is a section taken along the line 2—2 of FIG. 1;

FIG. 3 is a perspective view of an alignment pin made in accordance with this invention;

FIG. 4 is a perspective view of an alignment bushing made in accordance with this invention;

FIG. 5 is a fragmentary sectional elevation disclosing a method of setting an alignment bushing; and FIG. 6 is an enlarged fragmentary sectional elevation of an alignment pin bonded to a supporting surface by a magnetic shot composition.

Broadly speaking, this invention contemplates the setting of alignment pins and bushings, hereinafter referred to generically as alignment posts, in the halves of shaped foundry articles, such as patterns or molds, before these halves have been formed. The posts are first accurately located on a supporting surface by any convenient apparatus, preferably by accurate aligning tools. Each post is then held in place by the tool until the post can be mechanically or magnetically locked or bonded to the supporting surface, preferably by a cement or magnetic substances. After the posts are locked on the supporting surface, fluent materials, which are dimensionally stable and temperature resistant, are deposited upon the supporting surface surrounding the alignment posts at the desired depth. At this stage, the fluent material is plastic so that it may be deformed by templets or cutting tools to create the desired impression or design in the face of the material. Neither the depositing of the fluent material about the alignment posts nor the formation of the design places any shifting strain upon the posts. After the designs are formed the plastic material is set or solidified to form the completed rigid structure for one-half of the shaped article.

The identical process is carried out for forming the other half of the shaped article, so that the posts in the cope are accurately aligned opposite the posts in the drag. However, where a post in the cope is a pin, the opposite post in the drag is a bushing, and vice versa. Thus, a pin registers with a bushing to accurately align the mating halves for assembly for the next foundry process. For example, if a pattern is being made, the pattern halves will be accurately assembled for making a mold.

One form of apparatus for carrying out the process of setting the pins and bushings is disclosed in FIGS. 1 and 2. A rectangular or square box frame 10 is mounted on a horizontal supporting table or platform 11 for receiving the fluent mass of material 12.

Mounted above the box frame 10 is a superstructure comprising a cross beam 14 stationarily supported in any convenient manner. The vertical spindle 15 is mounted for rotational movement about an axis through the center of the platform 11 by means of an upper bearing 16. The spindle 15 may be vertically adjusted in the bearing 16 by means of the adjustable collar 17. The lower part of the spindle 15 is supported in the lower bearing 18 in the platform 11. Extending laterally from and fixed to the the lower portion of spindle 15 is an arm 20 having a series of vertical holes 21 extending therethrough being accurately spaced radially from said spindle 15.

The arm 20 is fixed to the spindle 15 by any convenient means, such as an adjustable upper collar 22 and a lower collar 23. The outer end of the arm 20 is further supported by a steel rod 24 having two axially aligned sections adjustably connected by the turnbuckle 25. The upper end of the rod 24 is fixed to the spindle 15 by means of a collar 26, while the lower end of the rod 24 is fixed, by any convenient means, such as by welding, to the outer end of the arm 20.

FIGS. 1, 2, 3 and 6 disclose a preferred form of an alignment pin 30 comprising a solid cylindrical rod or bar 31, having supporting fingers 32 fixed adjacent the flat base 33 of the rod 31 and extending radially from the rod 31. The base 33 is flat and its plane is normal to the axis of the rod 31. The bottoms of the outer ends of the radial fingers 32 must be in the same plane as the base 33 in order to stabilize the alignment pin 30 upon a flat supporting surface, such as the platform 11, as best disclosed in FIGS. 1 and 6. The drawings, of course, disclose the bottoms of the entire length of the fingers 32 being in the plane of the base 33.

FIGS. 4 and 5 disclose a preferred form of an alignment bushing 35 comprising a hollow or tubular cylindrical member 36 having radial fingers 37 similar to the fingers 32, fixed to the cylindrical member 36 adjacent the flat base 38 and extending radially therefrom. The plane of the base 38 is also normal to the axis of the tubular member 36. The radial fingers 37 are located with respect to the cylindrical member 36 in the same manner as the radial fingers 32 are related to rod 31. Thus, the fingers 37 function in the same manner to stabilize the cylindrical member 36 in an upright vertical position when supported upon a horizontal supporting surface, such as a platform 11, as best disclosed in FIG. 5.

In order to set the pins 30 and bushings 35 in the precise position desired upon the platform 11, the diameter of the holes 21 are uniform and equal to the outer diameter of rod 31, so that the rod 31 may be snugly fitted, but not jammed, through any one of the holes 21. By raising the spindle 15, an alignment pin 30 may be pushed from the bottom upwardly through the hole 21 having the desired radial distance from the spindle 15 for accurately locating the pin 30 (FIGS. 1 and 2). The arm 20 can then be rotated to the desired circumferential location and the arm 20 lowered until the alignment pin 30 is precisely set in its exact location. The arm 20 can be locked in this position by the set screws on the appropriate collars 22 and 26, or by any other convenient locking means.

The alignment pin 30 is either mechanically or magnetically locked or bonded to the platform 11 by depositing a bonding material such as 40 (FIG. 1) or 41 (FIG. 6) around the alignment post, such as pin 30. The material 40 may be any type of adhesive or cement mixture which will bond alignment pin 30 or bushing 35 to the platform 11. A preferred form of cement material 40 is a sand-resin mixture comprising less than 20% resin. An example of such a sand-resin mixture could have the following composition:

8½–20% thermosetting resin, such as phenol formaldehyde
¼–1½ % finely divided molding clay
⅓–¾ % wetting agent, such as kerosene
Balance, graded silica sand The bonding material 41 comprises magnetic shot 42 such as iron or steel balls, which has been magnetized to bond a magnetic post, such as steel aligning pin 31, to a magnetic steel platform 11. If desired, the magnetic shot 42 may be mixed with a cement material, such as the sand-resin bonding material 40 or a mixture of finely divided iron powders with a sand-resin cement mixture. The iron powder helps strengthen the magnetic bond between the shot 42.

Actually, it is preferred that the bonding materials 40 and 41 be the same as, or substantially the same as, the composition of materials employed in the fluent mass 12 for economy of materials as well as homogeneity. After the bonding materials 40 and 41 have set, such as by curing the sand-resin mixture 40 into a solid locking mass, the arm 20 may be elevated to separate the pin 30 from the mating hole 21. A fluent material 12 is then poured upon the supporting platform 11 to fill the box frame 10 up to the level indicated by the phantom line in FIG. 1, which is less than the height of the pin 30. The material 12 is preferably in plastic form, that is, capable of being permanently formed by a templet or other type of pattern tool. The desired configuration is formed in the exposed surface or face of the mass 12 by the templet or pattern tool or pattern member and then solidified to form a rigid structure by any convenient means appropriate to the type of material employed. For example, if the sand-resin cement mixture is employed, it may be solidified by curing by heat, and if magnetic shot is used, then the magnetism through the shot makes the structure rigid. The processes for actually making the shaped articles are more fully described in original application S.N. 51,632, now abandoned.

The alignment bushing 35 is set in substantially the same manner as the alignment pin 30. The same arm 20 with the same diameter holes 21 may be employed, but a cylindrical rod 45 (FIG. 5) having an outer diameter identical to the diameter of a pin 31 is fitted in the desired hole 21 and into the opening 46 in the tubular member 36. The diameter of cylindrical opening 46 is identical to the diameter of each hole 21. In this manner, the bushing 35 is securely, yet detachably, held in the proper aligned position by the arm 20, as disclosed in FIG. 5.

It will be understood that other types of precision tools and means for holding the alignment pin 30 and the bushing 35 may be employed to accurately set the pins and bushings on the platform 11.

After one shaped article half has been formed in the above prescribed manner with the appropriate number of pins 30 and/or bushings 35, the process is repeated for forming the second mating half, except that bushings 35 are substituted for pins 31 and vice versa in corresponding positions on the second half. Thus, when the two pattern or mold halves have been completed, they may be assembled face to face with each pin 30 of one half being received by registering bushing 35 in the opposite half, so that the halves are perfectly aligned for casting a mold or a molded product.

FIG. 2 illustrates one method of carrying out this invention in which four alignment pins 30 have already been set, and a fifth pin is being held in position. All of these five pins 30 are radially equi-distant from the axis of spindle 15 and are circumferentially spaced at equal distances.

It will be observed that this process eliminates the cutting and drilling of machine tools, such as a jig borer, into the finished solid structure of an iron or steel pattern, and the attendant shifts and dis-alignments, which however slight, can produce dimensionally poor and unacceptable patterns, molds and castings.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A method for making a shaped foundry article comprising:
   (a) holding an alignment post in upright position,
   (b) moving said upright post to a predetermined position upon a supporting surface, while continuing to hold said post in said upright position,
   (c) bonding said post to said supporting surface while said post is held in said upright position,

(d) releasing said post after said post has been bonded in upright position,
(e) depositing fluent solid bodies, having means for bonding said bodies together upon said supporting surface surrounding said post to a predetermined depth not greater than the height of said post, to form a coherent workable mass,
(f) introducing a pattern member into said mass to form configurations in accordance with a predetermined design, and
(g) solidifying said mass into a rigid structure in which said post is permanently fixed.

2. The invention according to claim 1 in which said fluent solid bodies comprise sand mixed with resin, and the step of solidifying said mass comprises curing with heat.

3. The invention according to claim 1 in which said fluent solid bodies comprise dimensionally stable pellets impregnated with a cement mixture, and the step of solidifying said mass comprises the curing of said cement mixture to bond said cement mixture and said pellets.

4. The invention according to claim 1 in which said solid bodies comprise magnetic shot, said alignment post is steel and said supporting surface is steel.

5. The invention according to claim 4 further comprising the impregnation of the interstices of said magnetic shot with a mixture comprising iron powder.

References Cited by the Examiner
UNITED STATES PATENTS

| | | | |
|---|---|---|---|
| 2,188,091 | 1/40 | Baermann | 264—111 |
| 2,847,741 | 8/58 | Meves et al. | 22—193 |
| 2,854,715 | 10/58 | Kura | 22—193 |
| 2,976,588 | 3/61 | Amala et al. | 22—193 |

FOREIGN PATENTS

| | | |
|---|---|---|
| 185,508 | 1/55 | Austria. |
| 2,709 | 1875 | Great Britain. |

MARCUS U. LYONS, *Primary Examiner.*

MICHAEL V. BRINDISI, *Examiner.*